(12) United States Patent
Renner

(10) Patent No.: US 11,465,441 B2
(45) Date of Patent: Oct. 11, 2022

(54) REINFORCED WHEEL FOR A VEHICLE

(71) Applicant: MUBEA CARBO TECH GMBH, Salzburg (AT)

(72) Inventor: Christoph Renner, Gosau (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 110 days.

(21) Appl. No.: 16/649,789

(22) PCT Filed: Sep. 28, 2018

(86) PCT No.: PCT/EP2018/076387
§ 371 (c)(1),
(2) Date: Mar. 23, 2020

(87) PCT Pub. No.: WO2019/063754
PCT Pub. Date: Apr. 4, 2019

(65) Prior Publication Data
US 2020/0307303 A1    Oct. 1, 2020

(30) Foreign Application Priority Data

Sep. 29, 2017 (CH) ................................ 01193/17

(51) Int. Cl.
*B60B 1/12* (2006.01)
*B60B 5/02* (2006.01)
*B60B 1/14* (2006.01)

(52) U.S. Cl.
CPC ............... *B60B 1/12* (2013.01); *B60B 5/02* (2013.01); *B60B 1/14* (2013.01); *B60B 2360/341* (2013.01)

(58) Field of Classification Search
CPC .... B60B 1/12; B60B 3/10; B60B 3/12; B60B 5/02; B60B 2360/341
See application file for complete search history.

(56) References Cited

U.S. PATENT DOCUMENTS

| | | | |
|---|---|---|---|
| 1,321,075 A | * | 11/1919 | Williams ............ B60B 1/12 301/67 |
| 1,737,935 A | | 12/1929 | Alexander |
| 5,918,947 A | | 7/1999 | Stach et al. |

(Continued)

FOREIGN PATENT DOCUMENTS

| | | | |
|---|---|---|---|
| DE | 10006400 A1 * | 8/2001 | ............ B29C 43/18 |
| EP | 0552436 A1 | 7/1993 | |

(Continued)

OTHER PUBLICATIONS

Machine Translation of JP 2001180201 A, 10 Pages (Year: 2001).*

(Continued)

*Primary Examiner* — S. Joseph Morano
*Assistant Examiner* — Emily G. Castonguay
(74) *Attorney, Agent, or Firm* — GrowIP Law Group LLC

(57) ABSTRACT

Wheel comprising a rim and a wheel center wherein the wheel center comprises several spokes extending in a longitudinal direction from a wheel hub to the rim. At least one spoke comprises an outer wall surrounding a cavity extending in the longitudinal direction of the at least one spoke. The cavity is delimited from the outer wall by an inner surface. The at least one spoke further comprises a reinforcing member extending along the inner surface.

16 Claims, 3 Drawing Sheets

(56) References Cited

U.S. PATENT DOCUMENTS

| | | | | |
|---|---|---|---|---|
| 2001/0033104 A1* | 10/2001 | Hummel | ............... | B60B 3/06 |
| | | | | 301/64.101 |
| 2015/0258864 A1 | 9/2015 | Higle et al. | | |
| 2016/0288563 A1* | 10/2016 | Fukudome | ............ | B60B 5/02 |
| 2019/0389245 A1* | 12/2019 | Bedeschi | ............ | B60B 3/12 |

FOREIGN PATENT DOCUMENTS

| | | | | |
|---|---|---|---|---|
| EP | 0768191 A2 | 4/1997 | | |
| GB | 191388 A | 1/1923 | | |
| JP | S62115901 A | 7/1987 | | |
| JP | H10138701 A | 5/1998 | | |
| JP | 2000289401 A | 10/2000 | | |
| JP | 2001180201 A * | 7/2001 | ............. | B60B 1/12 |
| WO | 2014016211 | 1/2014 | | |
| WO | 2015158780 A1 | 10/2015 | | |

OTHER PUBLICATIONS

Machine Translation of DE 10006400 A1, 19 pages (Year: 2001).*
International Search Report for PCT/EP2018/076387 dated Feb. 20, 2019.
English translation of Office Action for Japanese Patent Application No. 2020-517145 dated May 24, 2022.

* cited by examiner

REINFORCED WHEEL FOR A VEHICLE

CROSS-REFERENCE TO RELATED APPLICATIONS

This application claims the benefit of the filing date of international PCT Application No. PCT/EP2018/076387, filed on Sep. 28, 2018, that in turn claims priority to Swiss Patent Application No. CH 01193/17, filed on Sep. 29, 2017, the contents of which are hereby incorporated by reference in their entirety.

FIELD OF THE INVENTION

The invention lies in the field of wheels made at least partially out of fiber reinforced material for passenger vehicles such as cars, motorcycles, etc.

BACKGROUND OF THE INVENTION

Wheels for vehicles must meet a comprehensive list of requirements, including specific dimensions, minimum mechanical competence, maximum total weight, specified mass distribution, durability and visual appearance. Light vehicle wheels are desirable to improve the driving quality and performance as well as to keep the overall vehicle weight light. At the same time, safety regulations exist to ensure sufficient durability, especially of the wheel's rim. On one hand, the design aims to make the wheel as light as possible, on the other hand, it is necessary to provide a sufficient durable and strong mechanical structure.

Due to advances in material research, the wheel material further shifted to light-metal and composite materials, which are light, durable and able to bear high loads at the same time. Hybrid-wheels made from fiber reinforced material only or a combination of fiber reinforced plastics as well as conventional materials, such as light weight metal alloys thereby provide very good results.

Wheels generally feature air openings and spokes which extend radially from the wheel center to the rim of the wheel. Wheels made from metallic light alloys produced in a casting process are known from the prior art. For weight reduction the spokes have an open cross section or are designed hollow. These hollow spokes are known to be manufactured by means of so called lost cores that are placed in the mold before the molding and are again removed after molding. These cores may e.g. be made from sand or wax. Alternatively the core may be made of a light material and stay inside the produced wheel Hybrid wheels which are partly made of alloy and partly of composite materials having hollow spokes are known from the prior art. US2015258864A published on the 17 Sep. 2015 by Porsche AG e.g. discloses a wheel for a motor vehicle composed essentially of a fiber composite material, wherein the spokes of the wheel are each formed with a longitudinally extending cavity.

WO15158780A1 published on Oct. 22, 2015 by Kringlan Composites, relates to a vehicle wheel made of fiber-reinforced plastic and with a hub region, which is centered with respect to the axis of rotation of the wheel and has fastening means for attaching the wheel to a vehicle wheel hub. The wheel spider here comprises an inner and an outer wheel spider sheet, which is in each case composed of fiber-reinforced plastic. By means of frictional connection of the inner and outer wheel spider sheet, at least one cavity is formed for stiffening the hollow body of the wheel spider in the region of the wheel hub and/or at least in a partial region of the spokes.

WO14016211A1, published on Jan. 30, 2014 by the Bayrische Motoren Werke AG, discloses a vehicle wheel made from composite fiber material consisting of a rim and of a rim spider, which forms spokes and contains a pre-shaped core. The core is located between two wheel-spider discs in a sandwich structure. In a variation of the invention, the core is further shaped like a timber frame with a plurality of supporting struts.

The wheel designs with hollow spokes, as known from the prior art, have a lower stability and stiffness than comparable wheels with spokes having a filled cross-section. Therefore, the wall thickness has to be carefully designed and locally thickened according to the specific load cases, which again leads to a higher overall weight of the wheel.

One objective of the invention is to optimize the wheel in terms of weight and material consumption and in terms of the wheel's stability and stiffness.

SUMMARY OF THE INVENTION

The disclosure relates to a wheel comprising a rim and a wheel center, wherein the wheel center comprises several spokes extending at least partially in an outward (radial) direction from a wheel hub, arranged in the middle of the wheel center, to the rim. The spokes can be arranged at an angle with respect to the radial direction or if appropriate can have a curved design. The rim and the wheel center can be produced as one part or as separate elements interconnected to each other in the area of an outer end of the spokes. The wheel may be designed as a hybrid wheel, where the wheel center is made of fiber reinforced composite material and the rim of a metal alloy or another suitable material. The wheel center is preferably manufactured in one piece.

Depending on the number of spokes present, at least one spoke comprises a cavity on the inside extending in a longitudinal direction of the spoke. The spoke is having an outer wall which is at least partially having a closed cross-section surrounding the cavity. The cavity is delimited from the outer wall by an inner surface of the spoke. The outer wall can have a variable thickness in the longitudinal direction of the at least one spoke and/or the thickness may vary around the circumference of the cavity. The cavity may either be a closed cavity or may be connected to the outside by at least one opening. The opening can be oriented towards the rim or towards the wheel hub and can further correspond to the cross-section of the cavity. Alternatively or in addition, at least one auxiliary opening can be foreseen, e.g. for maintenance and/or manufacturing purposes and/or as a drainage hole. The at least one auxiliary opening can be arranged at one end of the spoke, at both ends of the spoke or in between.

The at least one spoke comprises a reinforcing member extending along the inner surface of the spoke. In a preferred variation, the at least one reinforcing member protrudes from the inner surface of the spoke into the cavity extending above the inner surface of the spoke separating the inner surface in zones, as will be described in more detail hereinafter. Alternatively or in addition, the reinforcing member may protrude at least partially from the inner surface into the spoke and/or may be arranged in a respective furrow of the outer wall, which can improve the anchoring. Furthermore, it may facilitate the mounting of the reinforcing member. Advantageously, the at least one reinforcing member is at least partially made of fiber reinforced composite material.

The reinforcing member is normally attached to the outer wall, respectively the wheel center, by glue, such as e.g. the resin of the fiber reinforced material. Good results in terms of stability and stiffness of the reinforcing member can be achieved, if the reinforcing member is at least partially made from unidirectional fibers which can be at least partially embedded in the outer wall of the spoke. The outer wall is preferably made from fiber reinforced composite material. Good results can be achieved when the fiber reinforced material of the outer wall consists at least partially from several layers having different fiber directions with respect to the longitudinal direction of the spoke. Depending on the field of application, the outer wall, respectively the spokes, can also be made from metal. The reinforcing member may be a separate element interconnected to the at least one spoke and/or it can be made as an integral part of the spoke, i.e. it is made from the same material. If the wheel center is made of fiber reinforced composite material, the reinforcement member may alternatively also be manufactured in one piece together with the wheel center.

In a preferred variation of the disclosure, the reinforcing member comprises at least one rib. The at least one rib can be arranged in a longitudinal and/or in a transverse, e.g. circumferential, direction of the at least one spoke. The at least one rib may further divide the inner surface into several zones. A zone is typically an area with a thinner outer wall thickness (between an outer surface and the inner surface of the spoke in the area of the cavity) compared to the area comprising a rib, where the thickness of the rib adds Up to a larger total wall thickness. The rib at least partially encompasses and thereby stabilizes the zone with the thinner outer wall thickness. A zone is a part of the inner surface of the cavity and is encompassed by either a rib and/or an outer end of the cavity. Depending on the geometry and design of the spoke, some areas of the zones, might still feature an outer wall thickness that is thicker than the total wall thickness in the area of the rib, including the rib thickness. This may e.g. be the case, where the structure of the spoke demands a stronger structure such as at the corners of an essentially rectangular spoke. Since in these areas the spokes' structure is already strengthened, the ribs are advantageously displaced to these areas (e.g. alternating).

Multiple ribs of the reinforcing member along the inner surface of the cavity are advantageous to yield a more homogeneous reinforcement over the extent of the cavity. If multiple ribs are present, it is further of advantage to have at least two intersecting ribs. Preferably, such an intersection of the ribs divides the inner surface into at least two zones. The at least two ribs may be arranged at least partly parallel to each other. The ribs can have an even or an uneven distance to each other depending on the load intended to be transferred by the spoke. Furthermore, each rib may have a different size or thickness, depending on the individual location, the spoke and the cavity design.

Depending on the application and the design of the wheel, the at least one rib may further have different shapes. The at least one rib may e.g. be ring or spiral or U-shaped. A good reinforcement of the spoke may be achieved by a ring or spiral-shaped rib, by orienting the rib around a middle axis (extending from the hub towards the rim) of the at least one spoke. A ring shaped rib may be oriented in a first plane essentially perpendicular to said middle axis (hence extending in the transverse direction). For a more pronounced reinforcement effect, multiple ring-shaped ribs can be provided. Preferably, these multiple ribs are arranged at least partially parallel to each other. Using a U-shaped rib may be advantageous, if the rib is arranged in the longitudinal direction with the cavity having an opening. The bottom of the U-shaped rib, connecting the two legs of the U, is then placed at the inner end of the cavity (opposite of the opening), such that the ends of the two legs are directed towards the opening of the cavity. Furthermore, if the reinforcing member extends towards the rim, it is advantageous if the ends of the reinforcing member follow the shape of the rim, such that additional support for the interconnection between the rim and the wheel center is given. The U-shaped rib is hereby preferably oriented in a second plane, defined by the middle axis of the at least one spoke and a rotation axis of the wheel or arranged rotated to that by 90 degrees (around the middle axis).

Depending on the design of the spokes, a combination of multiple types of ribs can be used to form the reinforcing member, such as e.g. a mixture of several circumferential ring shaped ribs that are oriented at least partially parallel to each other in combination with at least one U-shaped rib, such that a cage like structure is formed that supports and encompasses the cavity. Additionally or alternatively, the reinforcing member might also feature two U-Shaped ribs that are arranged rotated by 90 degrees (around the middle axis) with respect to each other.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described embodiments will be more fully understood from the detailed description given herein below and the accompanying drawings, which should not be considered limiting to the features described in the appended claims. The drawings are showing:

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be understood as limited to the embodiments set forth herein; rather, these embodiments are provided so that this disclosure will satisfy applicable legal requirements. Whenever possible, like reference numbers will be used to refer to like components or parts.

Figure 1:
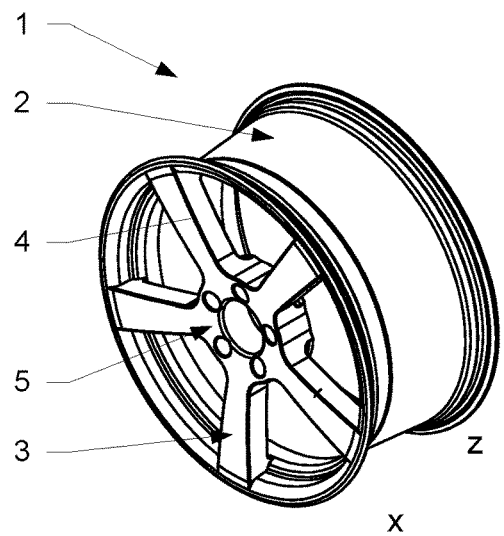
FIG. 1 A first variation of the wheel according to the disclosure in a perspective view.
Figure 2:
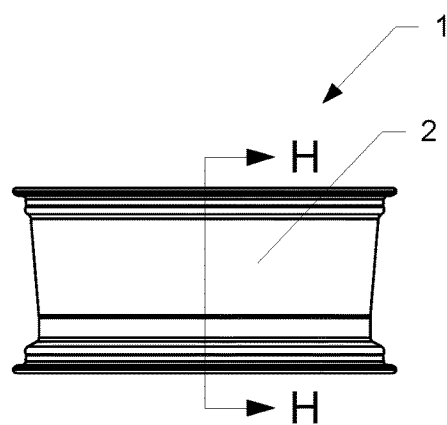
FIG. 2 a top view of the wheel according to FIG. 1.
Figure 3:
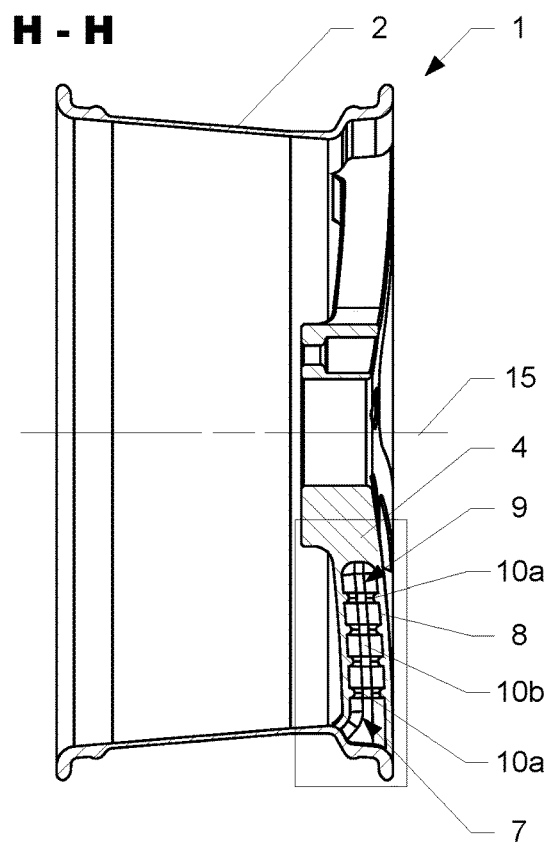
FIG. 3 a cross-sectional view (H-H) of the wheel according to FIG. 2.
Figure 4:
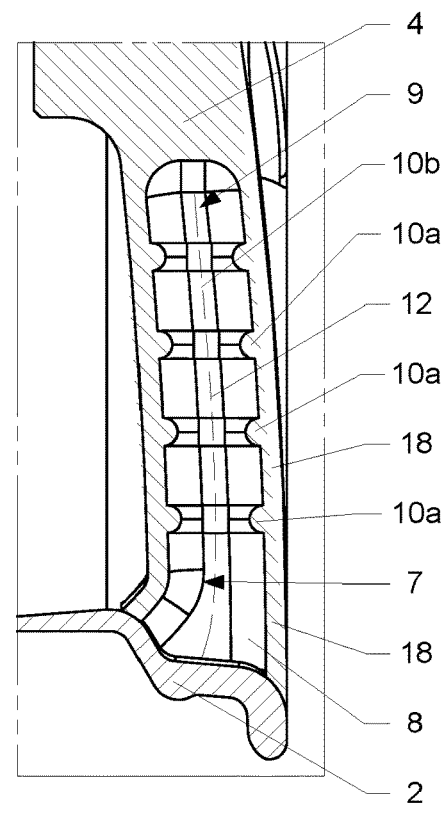
FIG. 4 a detail view of a spoke of the wheel according to FIG. 3.
Figure 5:
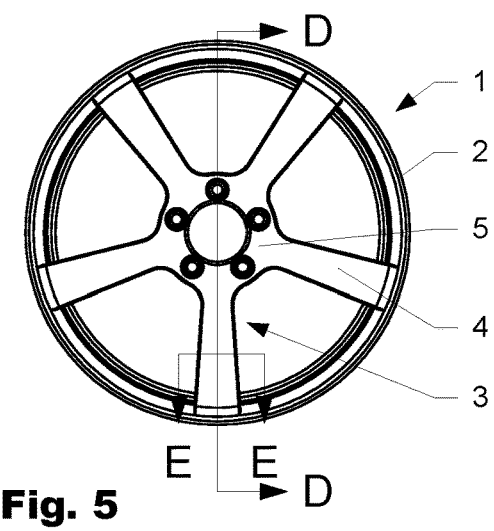
FIG. 5 a second variation of the wheel according to the disclosure in a front view.
Figure 6:
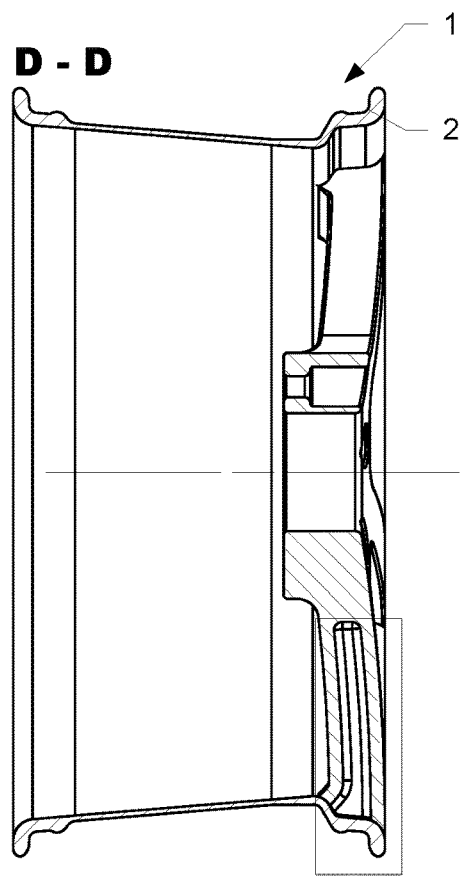
FIG. 6 a cross-sectional view (D-D) of the wheel according to FIG. 5.

FIG. 1 to FIG. 4 show a first variation of the wheel 1 according to the disclosure. The wheel 1 comprises a rim 2 and a wheel center 3. The wheel center 3 further comprises several spokes 4 extending radially outwards from a wheel hub 5 towards the rim 2. FIG. 3 and FIG. 4 hereby offer a cross-sectional view into one spoke 4 extending in the longitudinal direction of the spoke 4 having a cavity 7. The cavity 7 is extending in the longitudinal direction and is surrounded by an inner surface 8 of the spoke 4. In the spoke 4 a reinforcing member 9 is present, which extends along said inner surface 8 of the spoke 4. In the shown variation, the reinforcing member 9 comprises several ribs that are ring shaped 10a and one U-shaped rib 10b. The ribs 10a, 10b protrude from the inner surface 8 into the cavity 7. The ring-shaped ribs 10a are arranged at least partially parallel to each other. Depending on the application, it might also be advantageous that each ring-shaped rib 10a is oriented in a first plane 13 (compare FIG. 9) essentially perpendicular to a middle axis 12 of the cavity 7 and/or the spoke 4 extending in the longitudinal direction. Since the shape of the cavity 7 might be at least partly curved, the middle axis might have a non-straight geometry. Furthermore, since in the shown variation the cavity 7 is broadening in its width (in the transverse direction) over the length of the spoke, the size of the ring shaped ribs 10a are also increasing in that direction.

In the shown first variation of the wheel 1, the thickness of each rib 10 is more or less the same, however, variations where the thickness of a reinforcing member 9 is varying are also possible. Thereby the thickness of one ribs 10 might differ depending on their placement and/or the thickness of one rib 10 might change in itself. In the shown cross-sectional views (FIG. 3 and FIG. 4), it can be seen that the thickness of the outer wall 18 together with the thickness of the ribs (in the area of the ribs) is overall thicker, than the outer wall thickness of an adjacent zone 11 next to the rib 10.

In the shown first variation of the wheel 1, the ring-shaped ribs 10a are essentially oriented parallel to each other. Each ring shaped rib 10a does therefore intersect twice with the U-shaped rib 10b extending in the longitudinal direction. Between the ribs 10a, and 10b, the inner surface 8 of the spokes 4 is divided in separate zones 11, such that a zone 11 is in most cases surrounded by the ribs 10. Only the zones 11 arranged at the outer end 6 of the spoke 4 are bordered by the opening respectively the end of the cavity 7 and the ribs 10.

Figure 7:
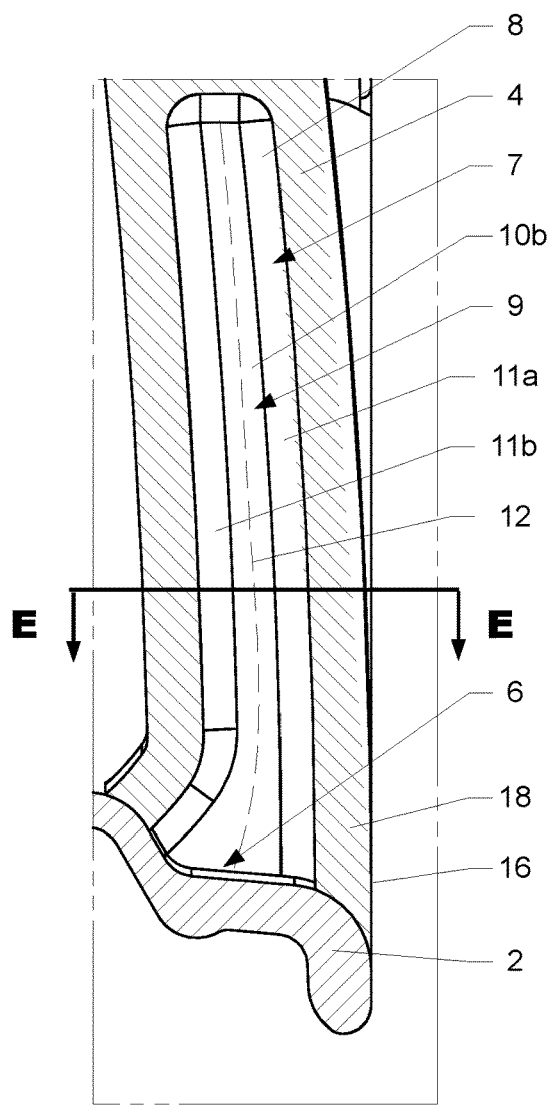
FIG. 7 a detailed view of a spoke of the wheel according to FIG. 6.

In FIG. 5 to FIG. 8 a second variation of the wheel 1 according to the disclosure is shown. The shown variation differs from the variation described before in the type and orientation of the reinforcing member 9. Here, the reinforcing member 9 comprises only one rib 10b that is essentially U-shaped and oriented in the longitudinal direction. In the shown case, the structure of the rib is oriented in a second plane 14 (compare FIG. 9), being defined by the rotation axis 15 of the wheel 1 and the middle axis 12 of the spoke 4. However, depending on the geometry of the wheel 1, the rib may also be rotated by 90 degrees around the middle axis. The U-shape of the rib 10b is selected due to the shape of the cavity 7, respectively the inner surface 8. FIG. 7 illustrates further, how the rib 10b follows the outline of the inner surface 8, especially at the outer end 6 of the spoke. Here the U-Shape is stronger and bends outwards, following the form of the cavity 7. Furthermore, if the reinforcing member 9 extends towards the rim 2, as shown, it is advantageous, if the ends of the reinforcing member 9 follow the shape of the rim 2, such that additional support for the interconnection between the rim 2 and the wheel center 3 is given.

Figure 8:
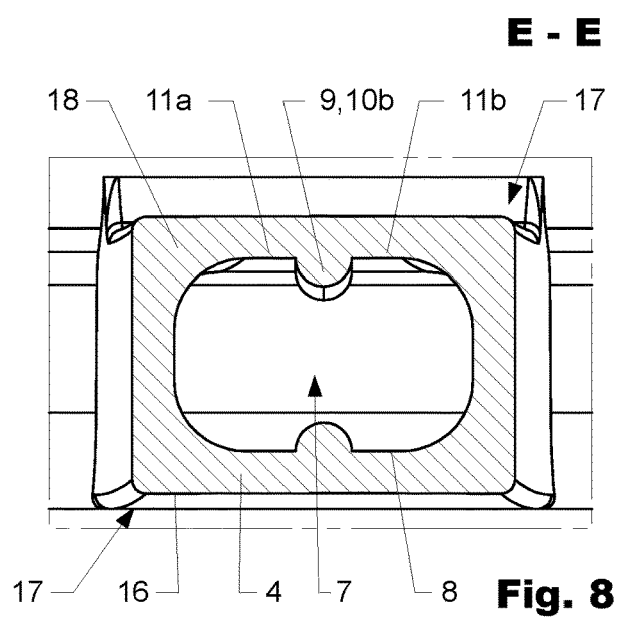
FIG. 8 a cross-sectional view (E-E) of the spoke according to FIG. 7 or FIG. 5.

FIG. 8 shows another cross-sectional view (E-E) of the second variation according to the disclosure as outlined in FIG. 7. The view illustrates how the two legs of the U-shaped rib 10b divide the inner surface 8 of the spoke 4 into two zones 11a, 11b. Furthermore, the varying outer wall thickness (between the outer surface 16 and the inner surface 8 of the spoke 4) can be seen. In the area of the rib 10b, respectively the reinforcing member 9, the outer wall 18 and the rib 10b create together a total wall thickness that is thicker than the thickness of the outer wall in the area of the adjacent zones 11a, 11b, right next to the rib 10b. However, it can be seen that there might be areas of the zones 11a, 11b, where the outer wall thickness is overall thicker as the total wall thickness in the area of the rib 10b (including the rib thickness). This may be the case, where the structure of the spoke demands a stronger structure such as the corners 17 of a rectangular spoke 4, as shown.

Figure 9:
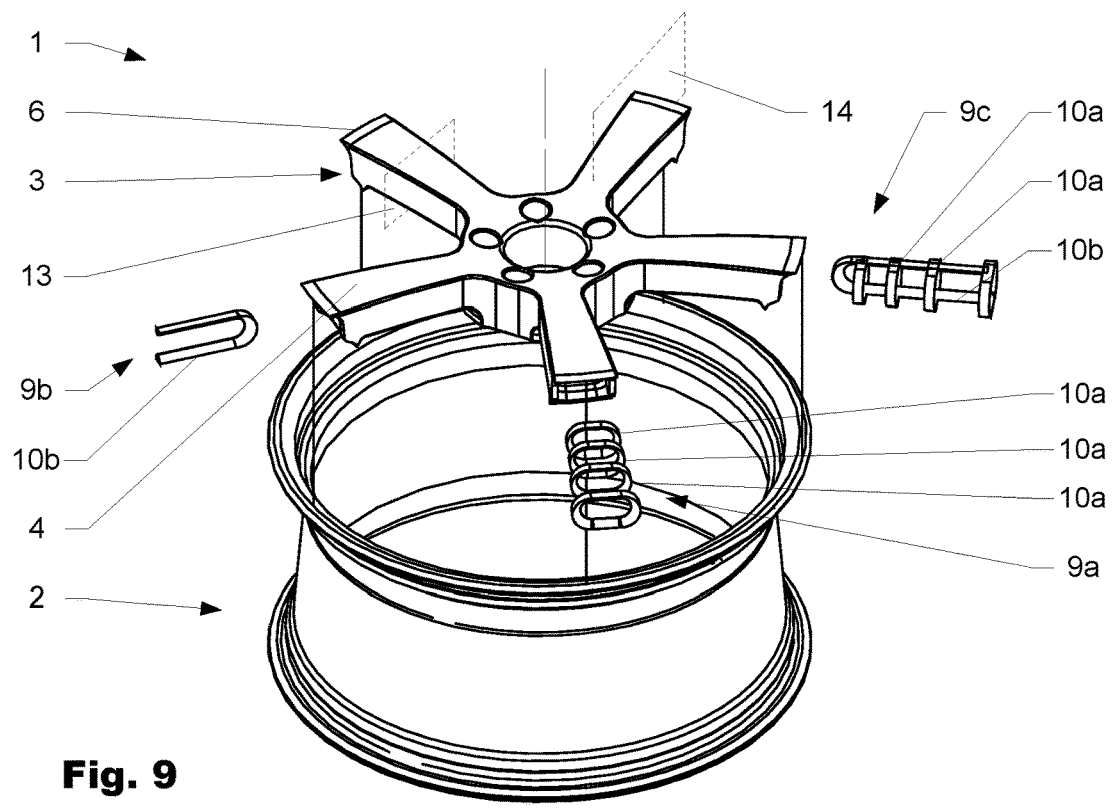
FIG. 9 a perspective view of a third variation of a wheel according to the disclosure having multiple spokes with cavities, each illustrated with a different reinforcing member.
Figure 10:
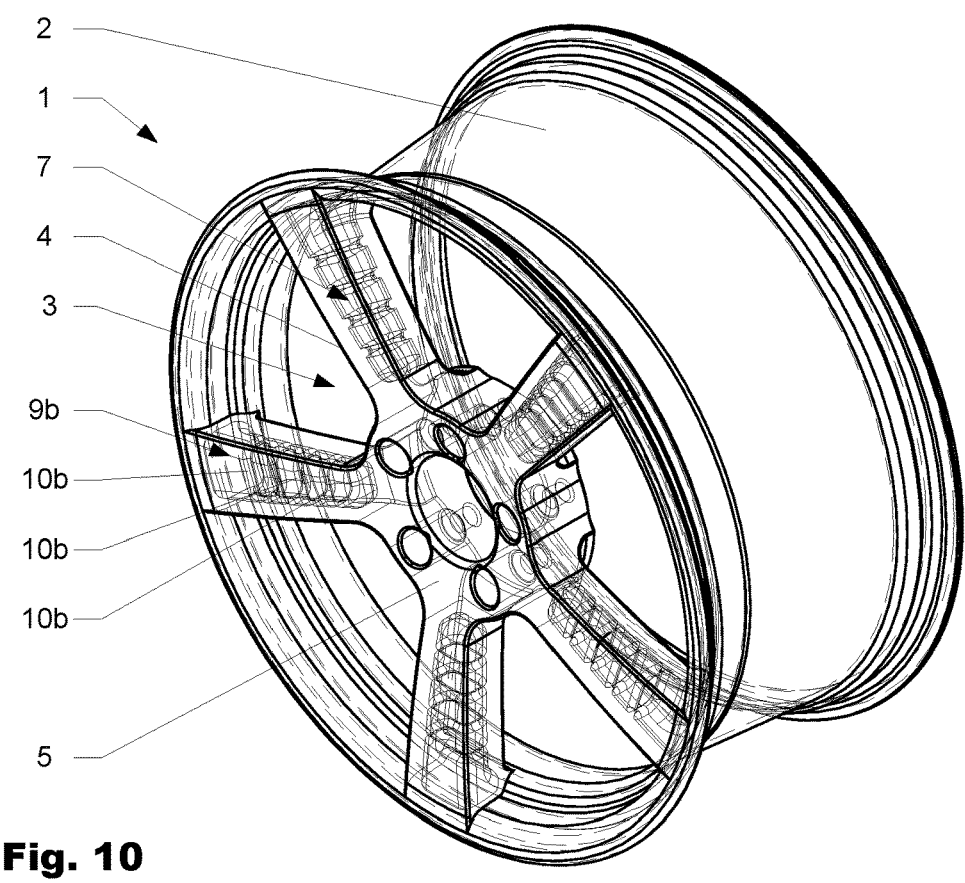
FIG. 10 a perspective view of the first variation of a wheel according to the disclosure with illustrated hidden lines.

FIG. 9 illustrates a third variation of the wheel 1 according to the disclosure in a dissembled view, with several spokes 4, having a cavity 7. In each cavity 7, a different reinforcing member 9a-c is inserted. The reinforcing member 9b comprises a single U-shaped rib 10b. The reinforcing member 9a comprises multiple ring-shaped ribs 10a arranged essentially parallel to each other around a middle axis 12 of the spoke 4 and/or the cavity 7. Reinforcing member 9c is a combination of the U-shaped rib 10b and multiple ring shaped ribs 10a such that the reinforcing member 9c has a cage-like structure FIG. 10 illustrates the wheel according to FIG. 1 to FIG. 4 assembled with visible hidden lines. It can be seen that the reinforcing member 9 in the assembled state is fully hidden for an observer. At the same time, the wheel 1 is much lighter than a wheel without such reinforcing structures since the overall mass is reduced due to thinner outer wall thicknesses.

The words used in the specification are words of description rather than limitation, and it is understood that various changes may be made without departing from the spirit and scope of the disclosure.

The invention claimed is:
1. A wheel comprising:
  a. a rim and a wheel center,
  b. wherein the wheel center comprises several spokes extending in a longitudinal direction from a wheel hub to the rim,
  c. wherein at least one spoke comprises an outer wall surrounding a cavity extending in the longitudinal direction of the at least one spoke, wherein the cavity is delimited from the outer wall by an inner surface, and
  d. wherein the at least one spoke comprises a reinforcing member extending along the inner surface, wherein the reinforcing member is made at least partially from unidirectional fibers, wherein the reinforcing member comprises at least one rib, wherein the at least one rib is U-shaped.
2. The wheel according to claim 1, wherein the rim and the wheel center are separate elements interconnected to each other at an outer end of the spoke.

3. The wheel according to claim 1, wherein the reinforcing member is a separate element interconnected to the at least one spoke.

4. The wheel according to claim 1, wherein the at least one rib is arranged in a transverse direction of the at least one spoke.

5. The wheel according to claim 1, wherein the reinforcing member comprises at least two ribs arranged at least partially parallel to each other.

6. The wheel according to claim 1, wherein the at least one reinforcing member is made of fiber reinforced composite material.

7. The wheel according to claim 1, wherein the wheel center is made of fiber reinforced composite material.

8. The wheel according to claim 1, wherein the at least one reinforcing member protrudes from the inner surface into the cavity.

9. The wheel according to claim 1, wherein the U-shaped rib is oriented in a second plane defined by the middle axis of the at least one spoke and a rotation axis of the wheel.

10. A wheel comprising:
    a. a rim and a wheel center,
    b. wherein the wheel center comprises several spokes extending in a longitudinal direction from a wheel hub to the rim,
    c. wherein at least one spoke comprises an outer wall surrounding a cavity extending in the longitudinal direction of the at least one spoke, wherein the cavity is delimited from the outer wall by an inner surface, and
    d. wherein the at least one spoke comprises a reinforcing member extending along the inner surface, wherein the reinforcing member is made at least partially from unidirectional fibers, wherein the reinforcing member comprises at least one rib, wherein the at least one rib is arranged in the longitudinal direction of the at least one spoke.

11. A wheel comprising:
    a. a rim and a wheel center,
    b. wherein the wheel center comprises several spokes extending in a longitudinal direction from a wheel hub to the rim,
    c. wherein at least one spoke comprises an outer wall surrounding a cavity extending in the longitudinal direction of the at least one spoke, wherein the cavity is delimited from the outer wall by an inner surface, and
    d. wherein the at least one spoke comprises a reinforcing member extending along the inner surface, wherein the reinforcing member is made at least partially from unidirectional fibers, wherein the reinforcing member comprises at least two intersecting ribs.

12. The wheel according to claim 11, wherein the at least two intersecting ribs divide the inner surface into at least two zones.

13. The wheel according to claim 12, wherein the thickness of the outer wall and the rib in the area of the rib is larger than the thickness of the outer wall in the area of a zone adjacent to the rib.

14. The wheel according to claim 11, wherein one rib one of the at least two intersecting ribs is ring shaped.

15. The wheel according to claim 14, wherein ring shaped rib is oriented around the middle axis of the at least one spoke.

16. The wheel according to claim 14, wherein the ring shaped rib is oriented in a first plane perpendicular to a middle axis of the spoke.

* * * * *